United States Patent [19]
Illingworth

[11] Patent Number: 5,831,838
[45] Date of Patent: Nov. 3, 1998

[54] RESONANT FLY-FORWARD CONVERTER CIRCUIT

[75] Inventor: Lewis Illingworth, Kensington, N.H.

[73] Assignee: Avionics Instruments, Inc., Avenel, N.J.

[21] Appl. No.: 882,281

[22] Filed: Jun. 25, 1997

Related U.S. Application Data

[63] Continuation-in-part of Ser. No. 568,934, Dec. 7, 1995, abandoned, which is a continuation-in-part of Ser. No. 106,924, Aug. 16, 1993, abandoned.

[51] Int. Cl.$^6$ .................................................. H02M 3/335
[52] U.S. Cl. .............................................................. 363/21
[58] Field of Search ................................ 363/20, 21, 97, 363/131

[56] References Cited

U.S. PATENT DOCUMENTS

| | | | |
|---|---|---|---|
| 5,126,931 | 6/1992 | Jitaru | 363/21 |
| 5,544,032 | 8/1996 | Mimura | 363/16 |
| 5,661,642 | 8/1997 | Shimashita | 363/21 |

*Primary Examiner*—Matthew V. Nguyen
*Attorney, Agent, or Firm*—Herbert M. Shapiro

[57] ABSTRACT

An improved fly forward converter including a capacitor connected across the collector and emitter of a switching transistor to form a parallel resonant circuit with the converter's transformer primary inductance, a diode across the switching transistor collector capacitor to conduct excess energy from the resonant circuit and coupling diodes in the converter's output circuit for coupling the energy in both the forward and flyback phases through an output inductor serially connected between the transformer secondary and the output capacitor. The converter includes a shunt capacitor with circuit values adjusted so that resonant action continues until the switching transistor voltage falls to zero for achieving "zero voltage switching". Zero voltage switching is achieved by varying the duration of the active cycle while the reset cycle duration is fixed and determined by resonant component value.

1 Claim, 3 Drawing Sheets

RESONANT FLY-FORWARD CONVERTER CIRCUIT

REFERENCE TO RELATED APPLICATIONS

The present application is a continuation-in-part of patent application Ser. No. 08/568,934 filed Dec. 7, 1995, abandoned, which is a CIP of application No. 08/106,924 filed Aug. 16, 1993, abandoned.

FIELD OF THE INVENTION

This invention relates to resonant dc-to-dc converters and more particularly to resonant switching power supply circuits exhibiting characteristics of both the forward-mode topology and the flyback topology and which are well suited to a wide range of input voltages.

BACKGROUND OF THE INVENTION

A conventional fly-forward converter combines the circuitry of both forward and flyback topologies in a way that allows power to be coupled to the output load during the times when the switching element is closed, when the operation is that of a forward converter; and also when the switch opens, when the operation is that of a flyback converter. In such systems, the overswing or reset voltage that the switch experiences is directly proportional to the output voltage and is totally independent of the input. This permits a wide input voltage range comparable to that of a flyback converter, while the predominant operating mode is that of a forward converter. The term "fly-forward" converter generally refers to circuits for which the energy stored in the magnetic components at switch turn off times (the reset energy) is a considerable fraction of the energy transfer during switch turn on. When the energy is relatively small, an identical circuit is sometimes termed a "forward" converter with constant voltage reset.

The purpose of this invention is to adapt the fly-forward topology to a resonant operating mode in order to reduce losses, reduce component stress and to increase the input voltage range.

BRIEF DESCRIPTION OF THE INVENTION

In accordance with the principles of the present invention, a dc-to-dc fly-forward converter has a capacitor connected across the switching element to resonate with the power transformer primary inductance. Also, the diode that carries the inductive energy to the output at switch turn off times is re-connected from the output side to the input side of the output filter inductor.

In a circuit in accordance with the principles of the present invention, when the switching element is turned on, the operation is identical to that of a forward converter. However, at switch turn-off, the voltage across it is controlled by the added shunt capacitor in conjunction with the transformer primary inductance. It is sinusoidal with peak voltage depending on the stored energy. Some of this energy is transferred to the load through the diode to the output inductor. The remaining energy brings the switch voltage close to zero at the end of the resonant cycle. Energy transfer to the output filter capacitor during this time is through the output inductor rather than directly to the capacitor so that the ripple current and component stress are minimized.

In accordance with the principles of the present invention, the rate of change of voltage at switch turn-off is controlled by a shunt capacitor and is much slower than that for a non-resonant fly-forward converter. Thus, the switching device has more time for the current drawn to fall to zero before the voltage across it reaches an appreciable value so that switching losses are minimized. Additional snubbers to remove transient voltage spikes and reduce switch turn off losses are no longer required.

The shunt capacitor causes problems due to voltage transients which discharge the capacitor at turn on. The result is an instantaneous current in the switching transistor and, as a consequence, poor efficiency. This problem is avoided by adjusting the circuit values so that the resonant action continues until the switching transistor voltage falls to zero. This is known as "zero voltage switching" as is shown hereinafter in connection with FIG. 2. Any prior art references of which applicant is aware would not permit "zero voltage switching" because they require circuit controls set for switch turn on some time after the resonant overswing is complete.

Further, the dependence of the reset voltage on magnetically stored energy allows it to be controlled by varying the switch turn on time. This is allowed to increase as the input voltage decreases in order to maintain constant peak switch voltage. Thus, the reset voltage for the resonant circuit at low input voltages may be much higher than that for a conventional fly-forward circuit in which, under these conditions, the constant reset voltage characteristic does not permit the switching element to reach it's rated value. Thus, the ratio of turn-on to turn-off time can be significantly greater and full power operation maintained at lower input voltages for an overall significantly wider operating range.

Still further, the connection of the shunt capacitor across the switching element permits it to absorb transients that would ordinarily be caused by leakage inductance in the power transformer. Accordingly, the transformer leakage inductance need not be as tightly controlled as in a conventional fly-forward converter. The transformer construction may be simpler, less expensive and more reliable.

The invention will be better understood by reference to the drawings in combination with the detailed description. As will be appreciated by one skilled in the art, the invention is applicable to dc-to-dc switching converter circuits, in general, and is not limited to the specific embodiments disclosed.

DETAILED DESCRIPTION OF AN ILLUSTRATIVE EMBODIMENT

Figure 1:
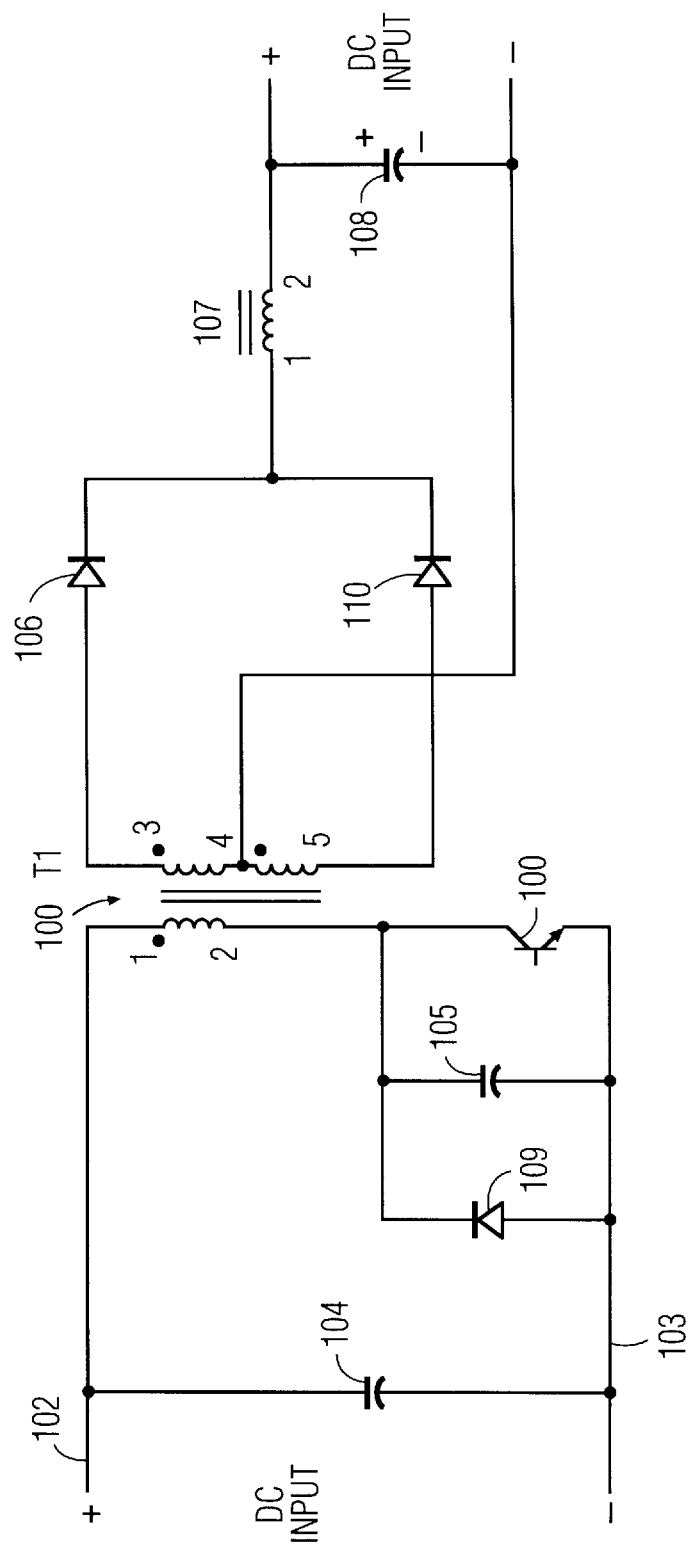
FIG. 1 shows a fly forward converter in accordance with the principles of this invention.

FIG. 1 shows a simplified form of a resonant fly forward converter in accordance with the principles of this invention. To begin, switching transistor 100 is connected to pin 2 of the primary of transformer 101. The positive side of the input dc voltage is applied on rail 102 and the negative side is applied on rail 103. Capacitor 104 is a relatively large bypass capacitor so that the positive and negative rails, 103 and 104, respectively, may be considered to be at the same potential for high frequency AC signals.

In order to control the switching rate of transistor 100, capacitor 105 is connected across emitter collector junction of transistor 100. Capacitor 105 forms a parallel resonant circuit with the inductance of transformer 101. In a conventional circuit, capacitor 105 would be replaced by some form of snubber or other circuit to limit the positive excursion of the collector of transistor 100.

Diode 106, which connects the fly back energy to the output, is connected to point 1 on the output inductor 107 instead of being connected to the positive side of the filter capacitor 108 as in conventional circuits. This change enables the voltage at the collector of transistor 100 at turnoff to be sinusoidal with a frequency determined by capacitor 105 and the inductance of the primary of transformer 101 in parallel with the inductance of inductor 107 reflected back to the primary of transformer 101.

Diode 109 is connected across capacitor 105 to conduct excess energy in the resonant circuit back to negative supply rail 103. When transistor 100 is a MOSFET transistor, diode 109 may be the inherent diode in the device rather than a separate device added to the circuit.

Figure 2:
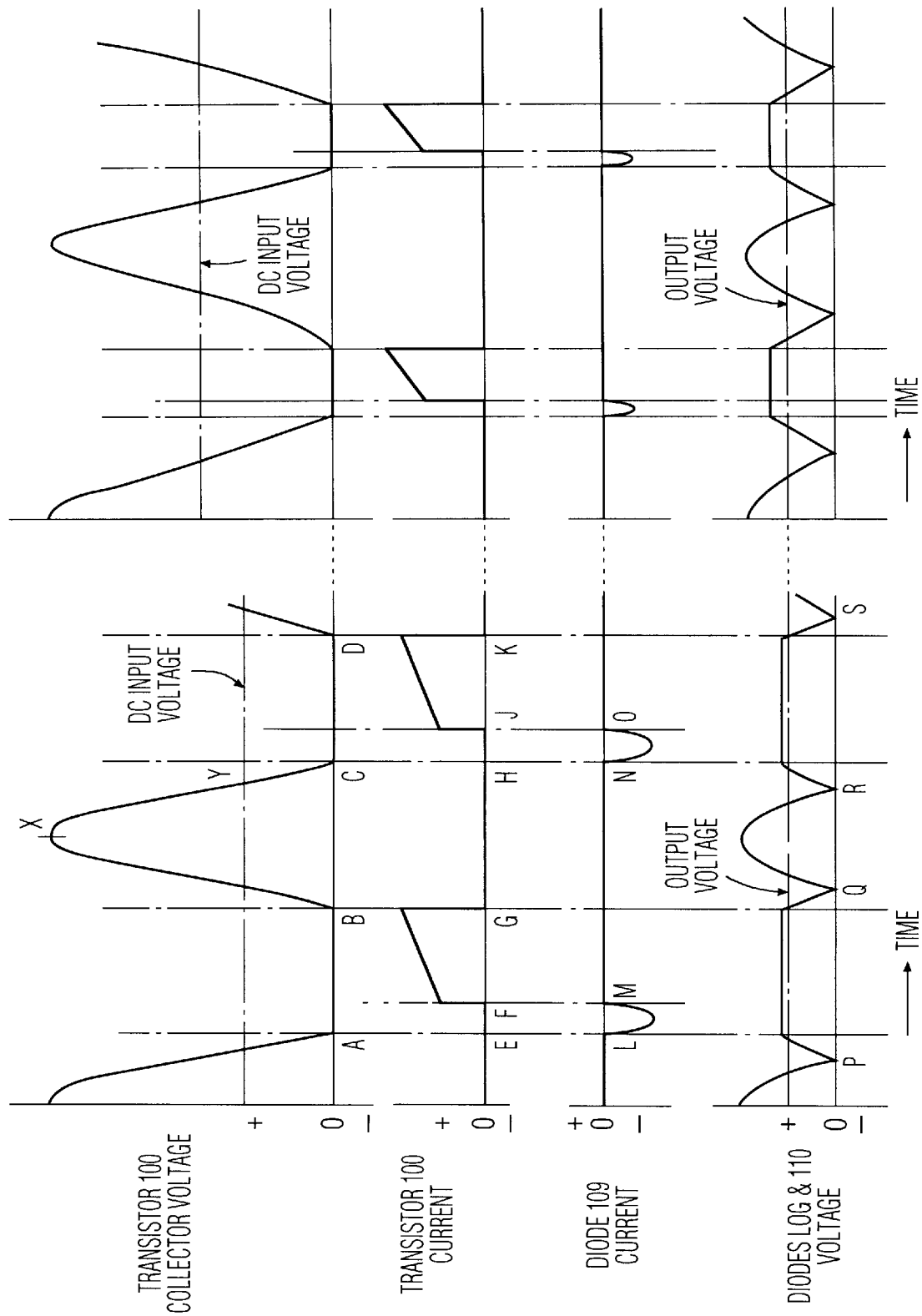
FIG. 2 illustrates current and voltage waveforms as a function of time for the circuit illustrated in FIG. 1.

The operation of the circuit of the embodiment of the present invention depicted in FIG. 1 can best be understood with reference to the voltage and current waveforms as a function of time as illustrated in FIG. 2. The point in time when transistor 100 turns on is indicated as point A in the waveform labelled "transistor 100 collector voltage". At time A, the collector voltage of transistor 100 is zero and the current is zero. The remaining energy in the primary of transformer 101 is conducted through diode 109 to rail 103. The current through diode 109 is commonly called the recycled current and its waveform is shown in FIG. 2 between reference points L and M. At the same time, current flows through diode 110 to inductor 107 to capacitor 108 and on to the output. The current flows from energy stored in transformer 101 and not from transistor 100 which plays no role in the operation until all of the transformer energy has been conducted through diode 109 or through diode 110 to the load.

When the current in diode 109 falls to zero, transistor 100 conducts and draws current throught the primary of transformer 101. At this point, the operation ceases to be resonant and the action is that of a forward converter with the current flowing through diode 106 and inductor 107 and to the output load. The current at this time is shown at point F in FIG. 2 and is the current through inductor 107 reflected to the primary of transformer 101. This current slowly increases with time as the magnetizing current in transformer 101 due to the inductance of primary winding 1–2 of transformer 101 and the inductance of inductor 107 reflected back. This function of the circuit of FIG. 1 is the same as in a conventional forward converter with the exception that the primary inductance of transformer 101 is somewhat lower in order to maintain satisfactory resonant operation on switching transistor turnoff.

When transistor 100 turns off (reference point B in FIG. 2), the collector voltage of transistor 100 rises sinusoidally, controlled by the parallel combination of capacitor 105, the inductance of transformer 101 and the inductance of inductor 107 reflected back. The current in inductor 107 maintains diode 110 conducting until pin 3 of transformer 101 goes negative. At the same time, pin 5 on the secondary side of transformer 101 goes positive and diode 106 begins to conduct. Point Q in FIG. 2 denotes the time at which this occurs. The waveform from time B to time X on the transistor 100 collector voltage waveform illustrates the voltage on the collector of transistor 100 when the inductive energy is transferred both to capacitor 105 on the primary side and through diode 106 to inductor 107 and the load on the secondary side. From point X to point Y on the transistor 100 collector voltage waveform, it can be seen that current flows from capacitor 105 back into the primary of transformer 101 and also on the secondary side through diode 106, inductor 107 and to the output load. Correspondingly, from point Y to point C on the transistor collector voltage waveform, it can be seen that the energy flows back from the primary of transformer 101 into capacitor 105 and on the secondary side through diode 110, inductor 107 and to the output load.

Thus, the turnoff cycle has energy stored in transformer 101 being transferred to the output load through diodes 110 and 106 in a way that has energy recycled between the primary of transformer 101 and capacitor 105. This energy transfer produces a sinusoidal waveform at the collector of transistor 100 with a controlled rate of change of voltage and an absence of high energy transients producing spikes.

In the embodiment of the present invention described above, inductor 107 is large compared with the inductance of the primary of the transformer which is reflected to the secondary and so has little effect on the resonant operation. It's value is chosen to provide an acceptable ripple current into the filter capacitor 108 so that it can be selected in a similar manner as that of a conventional forward converter and not as a high-ripple capacitor of the type needed for a conventional fly-forward circuit.

Transformer leakage inductance does not have to be tightly controlled because leakage inductance effects are absorbed in the resonant capacitor and cannot produce high voltage spikes.

As the transformer overswing is controlled by the resonant component values and not on a fixed transformer ratio, the circuit is well suited to a wide range of input voltages. The switch on to off duty cycle can be close to zero and has been operated up to 90%.

Figure 3:
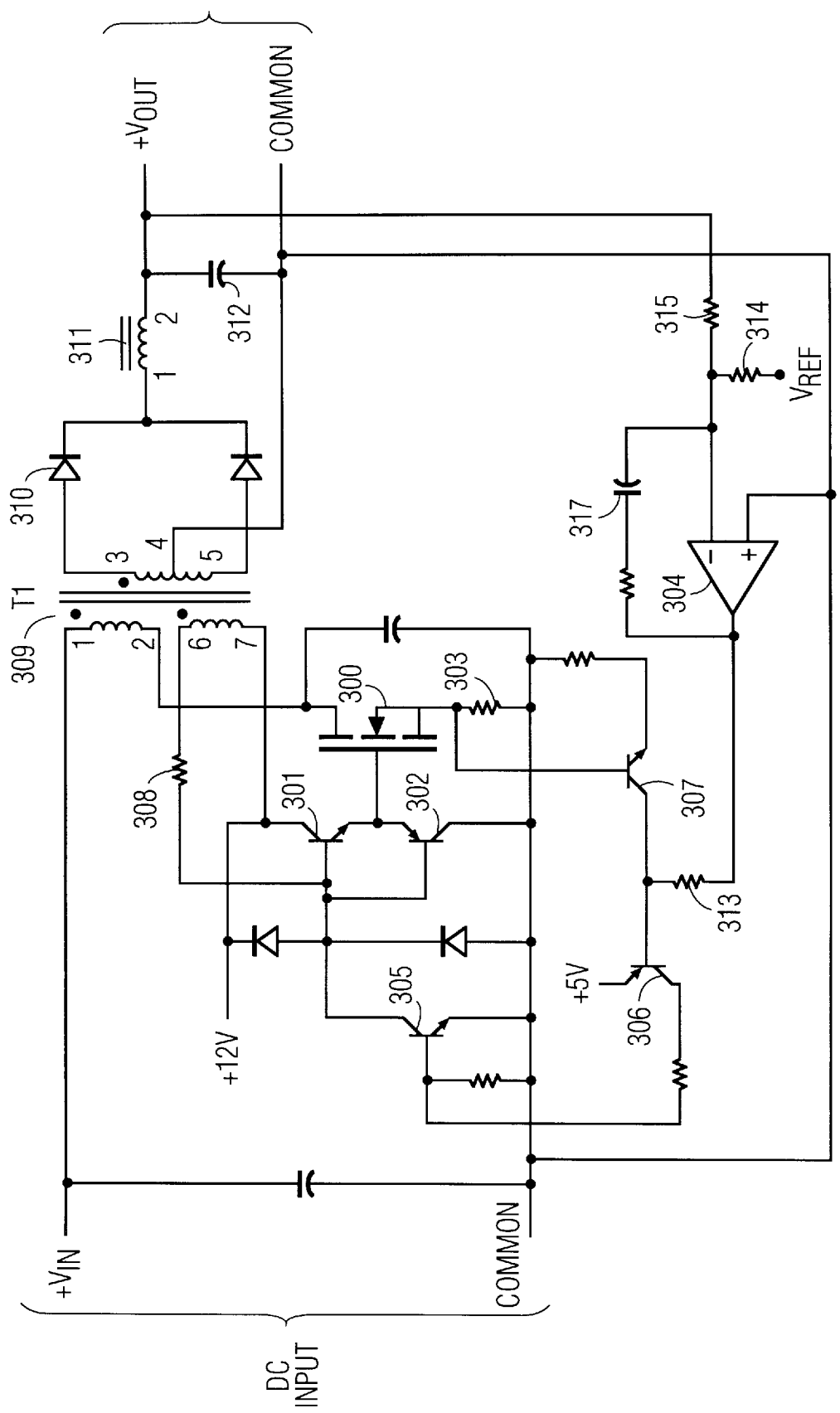
FIG. 3 is a schematic diagram of a fly forward converter in accordance with the principles of the present invention.

FIG. 3 shows a fly-forward converter also in accordance with the principles of the present invention and further including related control circuitry. Briefly, the circuit of FIG. 3 employs a MOSFET transistor 300 as the switching element in a self oscillating circuit with output voltage control. Transistors 301 and 302 drive the gate of transistor 301 and convert the voltage at their bases to the peak currents required to alternately charge and discharge the gate and the drain-to-gate miller capacitance. The purpose of resistor 303 is to sense transistor 300 current. Amplifier 304 is an operational amplifier of standard design and is used to compare the output voltage of transistor 300 with a reference voltage. Transistors 305, 306, and 307 form a decision network to pull the bases of transistors 301 and 302 negative in response to the current in transistor 300 and amplifier 304 output voltage.

Stated in more detail, the startup sequence begins with current flow through resistor 308 from a +12 volt auxiliary supply to pull the bases of transistors 301 and 302 to positive voltage. The emitter of transistor 301 pulls the gate of transistor 300 positive and transistor 300 turns on. Current flowing through primary 1–2 of transformer 309 causes output current through diode 310 and inductor 311 to charge capacitor 312 and supply the output load. Pin 6 of transformer 309 goes positive with respect to the auxiliary supply and holds transistor 300 in the turn-on state. As current in transistor 300 increases, the voltage across resistor 303 rises accordingly and transistor 307 draws collector current which is (ignoring the base-to-emitter voltage drop) proportional to the voltage across resistor 303 and consequently the current through transistor 300. This current causes a voltage drop across resistor 313 which is connected to the output of amplifier 304 and initially has a voltage drop across it which approximates the +12 volt auxiliary power supply. Thus, the voltage at the collector of transistor 307 falls from a level of +12 volts by an amount proportional to the current in transistor 300. When this voltage falls below an internal +5 volt reference level, transistor 306 turns on and this, in turn, draws current from the base of transistor 305. Transistor 305 turns on pulling the bases of transistors 301 and 302 negative. At the same time, the emitter of transistor 302 pulls the base of transistor 300 down to the input common level and transistor 300 turns off.

When transistor 305 turns off, the previously described sinusoidal flyback cycle is instituted. Pin 6 of transformer 309 goes negative and keeps the bases of transistors 301 and 302 negative until this part of the cycle ends and the drain of transistor 300 returns to the input common voltage. At this time, pin 6 of transformer 309 is again positive and transistor 300 is held on to start the next cycle. The operation is that of a self-oscillating converter for which the on time of the switch is determined by the current level in the switch compared to a control level and the turn off time by the resonating components.

Regulation is achieved by comparing the output voltage with an internal or external reference by the voltage divider combination of resistors 314 and 315. The difference is amplified by amplifier 304 with stabilizers in the form of resistor 316 and capacitor 317. Thus, less current is required in transistor 307 and, consequently transistor 300, for transistor 306 to begin the turn-off sequence. Hence, the time during which transistor 300 remains turned on is reduced.

The operating mode of the circuit of FIG. 3 is a current mode in which the peak current is used for control. As the duration of switch turn-off is maintained by the resonant components and is approximately constant, the mode may be termed "constant off time current mode". The system does, however, differ from a conventional current mode system in that it is not sensitive to cyclic instability when the duty cycle is either less than or more than 50%.

A fly-forward dc to dc converter, in accordance with the principles of this invention, is one in which energy is transferred from the primary to the secondary circuits during both active and inactive switching cycles. It differs from conventional configurations in that:

1. The energy transferred during the reset cycle, connected from transformer 101 through diode 110, is not coupled directly into the output filter capacitor 108, as is the usual case, but is connected to the input side of the forward converter filter inductor 107. This unique connection (which must not be confused with that for a push-pull forward converter in which a diode (110) would conduct on the forward stroke and not the reset stroke) minimizes the ripple current in filter capacitor 108 and reduces the loading on transformer 101 secondary winding 4 to 5 in order to allow resonant reset operation.

2. Capacitor 105 is connected directly across transistor 100 without any additional switching or precharging circuitry. This capacitor resonates with transformer 101 primary inductance during the reset cycle to generate a sinusoidal overswing. There are two reasons for this. The first is to slow down the rate of voltage increase, when transistor 100 is turned off, in order to minimize the switching losses. The second is to control and minimize the peak overswing voltage during the reset cycle. This permits the unique connection of diode 110, as described above. It has the additional advantage of eliminating the requirement for a primary reset winding on transformer 101 and associated diode that provide overswing voltage control in conventional circuits. Such reset systems limit the switching transistor on-off duty cycle and so limit the input voltage range. There is no duty cycle limit for the new circuit which operates over a very wide voltage range.

3. The direct connection of capacitor 105 across transistor 100 without the commonly used series switching transistor and auxiliary discharging circuit calls for specific operating conditions. Prior art dc to dc converters operate at constant frequency. In such a case, at the end of the reset cycle transistor (100) collector voltage returns to the input dc voltage level. When the next active cycle begins, the capacitor (105) is instantly discharged to zero volts, thus wasting power. A converter, in accordance with the principles of this invention, avoids this by beginning the active cycle at the end of the reset cycle when resonant action in the capacitor (105) and the transformer (101) brings the voltage automatically to zero. Hence zero voltage switching. In order for this to happen, a novel control circuit allows the reset cycle to be defined by the constant resonant overswing period and controls the converter output voltage by varying the duration of the transistor (100) turn on time.

The converter is unique in that it achieves zero voltage switching with a minimum number of power components, capacitor 105, transistor 100 and transformer 101 inductance. Varying the active cycle duration varies the operating frequency. A converter, in accordance with the principles of this invention cannot operate at constant frequency.

In summary, a converter in accordance with the principles of this invention is a variable frequency, zero voltage, switching, fly-forward converter with resonant reset cycle. Zero voltage switching is achieved without the use of active and passive components to discharge or precharge the resonating capacitor and is unique. Zero voltage switching is achieved by varying the duration of the active cycle while the reset cycle duration is fixed and determined by resonant component value. This is unique. Varying the active period duration thus varies the operating frequency. The system is inoperative at constant frequency. Power transfer during the reset cycle is through an inductor rather than directly into a filter capacitor, and ripple currents are minimized. Such an arrangement is unique in a fly-forward converter.

What is claimed is:

1. A fly-forward dc-to-dc converter, said converter comprising a source of dc input voltage having positive and negative terminals, said converter including a resonant circuit connected electrically in parallel with said source between said positive and negative terminals, said converter also including a transformer having a primary winding and at least one secondary winding, said positive terminal of said source of dc input voltage being connected to one pin of said primary winding, switch means for controlling the flow of current through said primary winding of said transformer, said switch means being connected between the other pin of said primary winding and said negative terminal of said source of dc voltage, first reservoir capacitive means connected across said switch means in a manner to achieve parallel resonance with said primary winding in the absence of a switching element in series with said capacitive means for controlling the maximum voltage and rate of voltage rise during switch turn off, an output capacitor load element across the output of said converter, an inductive element connected in series between said transformer secondary winding and said output capacitive load element, and diode means connected to said transformer secondary winding for conducting both forward and backward signals to said inductive element, said converter including means for turning on said switch means at the instant said switch means voltage falls to zero, wherein said switch means comprises a MOSFET transistor, said converter further comprising driving means including two transistors connected to the gate of said MOSFET transistor for controlling said MOSFET transistor, said converter also including an operational amplifier for comparing said output voltage with a reference voltage and a decision means responsive to the current in said MOSFET transistor and the output of said operational amplifier for controlling said driving means.

* * * * *